M. H. DAMERELL.
CRANK SHAFT TWISTING MACHINE.
APPLICATION FILED FEB. 16, 1917.

1,274,390.

Patented Aug. 6, 1918.
3 SHEETS—SHEET 1.

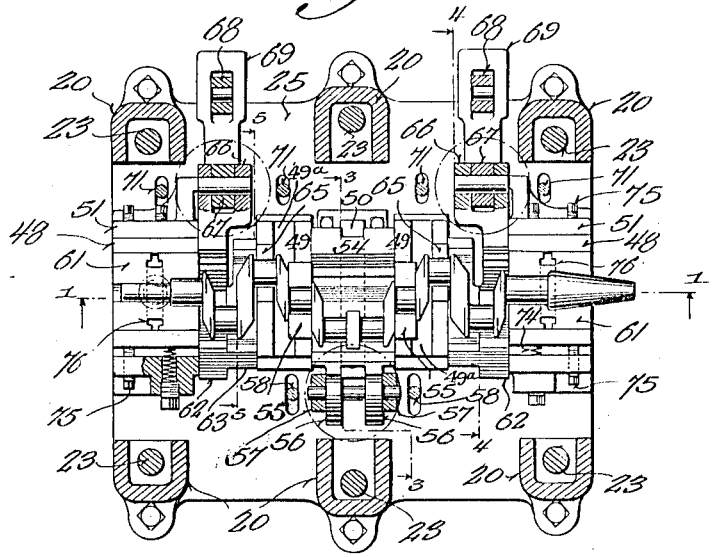
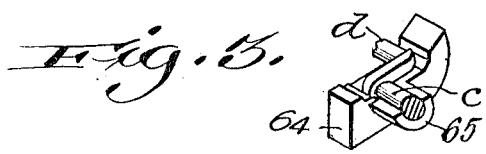
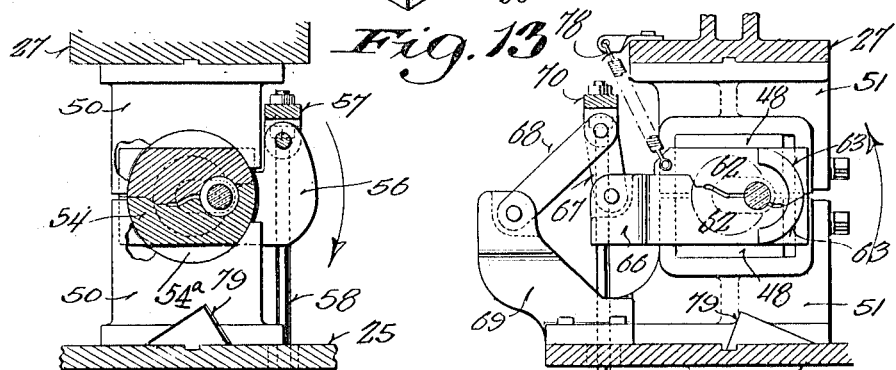
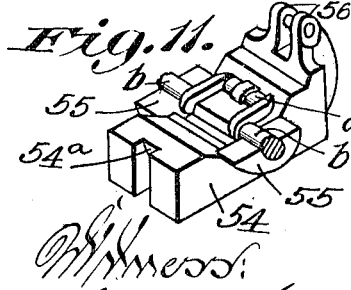
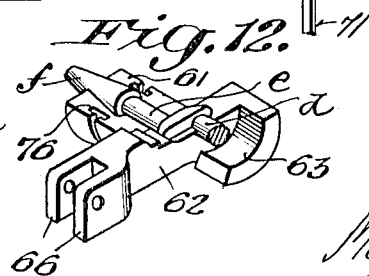

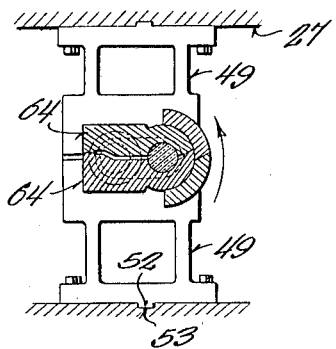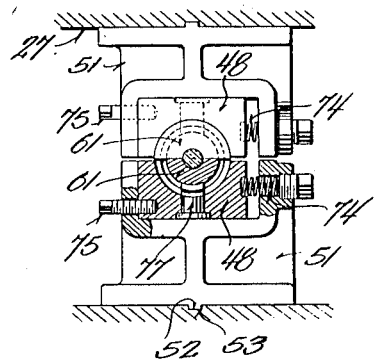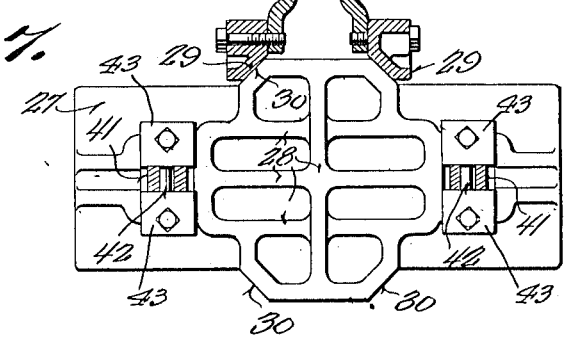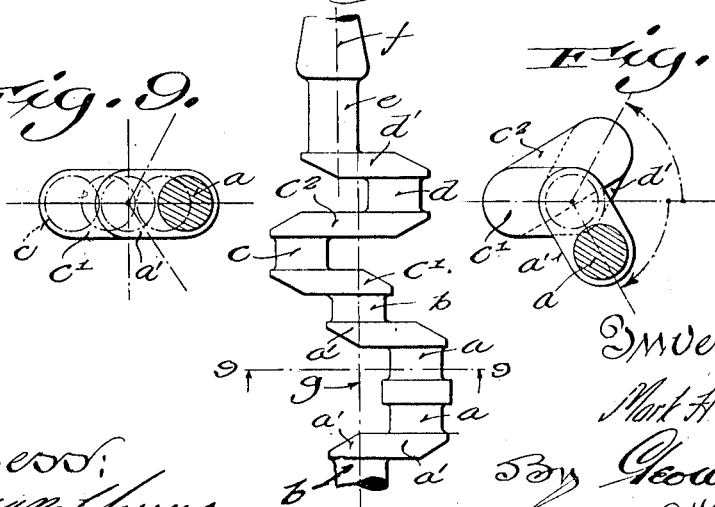

UNITED STATES PATENT OFFICE.

MARK H. DAMERELL, OF DETROIT, MICHIGAN, ASSIGNOR TO WYMAN-GORDON COMPANY, OF WORCESTER, MASSACHUSETTS, A CORPORATION OF MASSACHUSETTS.

CRANK-SHAFT-TWISTING MACHINE.

1,274,390.   Specification of Letters Patent.   Patented Aug. 6, 1918.

Application filed February 16, 1917. Serial No. 148,981.

*To all whom it may concern:*

Be it known that I, MARK H. DAMERELL, a citizen of the United States, and resident of Detroit, in the county of Wayne and State of Michigan, have invented certain new and useful Improvements in Crank-Shaft-Twisting Machines; and I do hereby declare that the following is a full, clear, and exact description thereof.

My invention is directed to the provision of a machine for twisting crank shafts to attain correct relative angular disposition of the crank bearings thereof.

It is found expedient to forge crank shafts and like articles with their various parts in the same plane, and to subsequently twist said parts to the desired angular positions, and it is primarily the object of my invention to provide a machine for simultaneously twisting all of the parts of a crank shaft or the like to their desired relative angular positions in a single operation, preferably while the crank shaft retains the heat imparted thereto during the forging operation.

A further important object relates to the provision of a machine for twisting crank shafts in such manner as to avoid distortion of the various parts thereof.

Inasmuch as certain of the cheek pieces of certain crank shafts extend directly from one crank bearing to another and are of relatively greater length than other cheek pieces, the twisting of the cheek pieces to secure proper angular relation of the crank bearings tends to produce an offsetting of the main bearings of the shaft, and it is another important object of my invention to provide an arrangement for correcting this offsetting tendency simultaneously with the general twisting operation.

A still further important object relates to the provision of a machine embodying the above advantages which is exceedingly positive in operation, which is comparatively simple in structure, and in the use of which the crank shaft may be inserted and removed in a manner to permit rapid operation of the machine.

With the above and other objects and advantages in view, the invention resides more particularly in the novel combination, formation and arrangement of parts hereinafter described and pointed out in the appended claims.

In the drawings,

Fig. 2 is a sectional plan view of the machine at the juncture of its working heads, taken substantially along the line 2—2 of Fig. 1;

Fig. 3 is a partial transverse sectional elevation taken on the line 3—3 of Fig. 2, and showing mechanism for twisting the central crank bearings of a six-throw crank shaft;

Fig. 4 is a similar view taken on the line 4—4 of Fig. 2, showing mechanism for twisting the end crank bearing and for simultaneously shifting the outer shaft bearing laterally;

Fig. 5 is a similar view taken on the line 5—5 of Fig. 2;

Fig. 6 is a left hand end elevation, partly in section, of the end trunnion blocks and guide blocks therefor;

Fig. 7 is a sectional plan view of the machine on the line 7—7 of Fig. 1;

Fig. 8 is a partial plan view of a six-throw crank shaft of the type adapted to be twisted by the present machine;

Fig. 9 is a sectional view of said crank shaft taken on the line 9—9 of Fig. 8, and showing in elevation the arrangement of its various bearings when forged;

Fig. 10 is a view similar to Fig. 9, but showing the various bearings in the desired twisted or final relation, and Figs. 11, 12 and 13 are perspective views of different twisting members.

Figure 1:
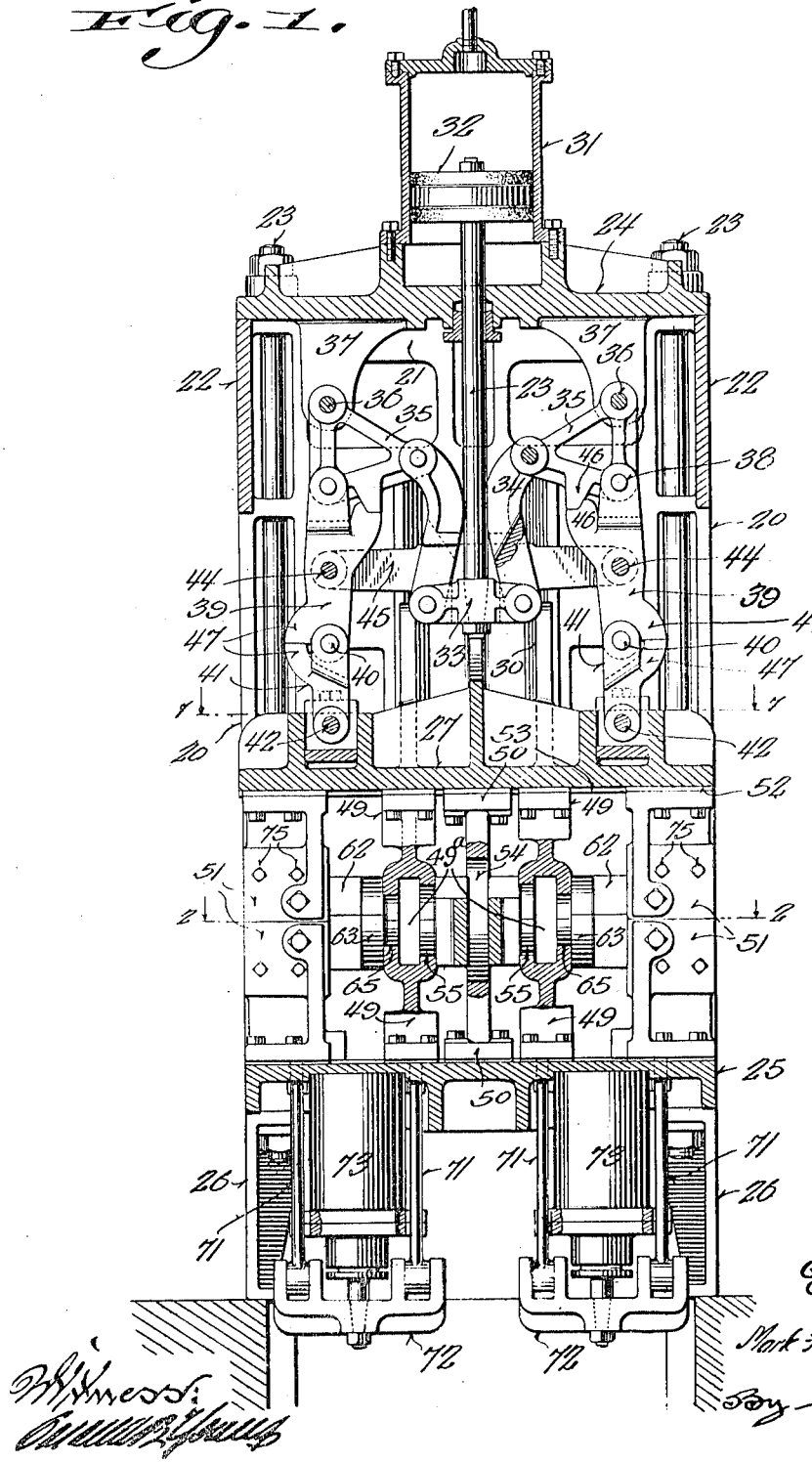
Figure 1 is a vertical longitudinal sectional view of the machine taken along the line 1—1 of Fig. 2.

Referring now more particularly to the accompanying drawings, wherein is shown one embodiment of my invention, there is provided a frame comprising a pair of side castings each including a series of spaced pillars 20 (Fig. 2) connected by suitable web portions 21 (Fig. 1). The side castings are connected by vertical plates 22 at their top portions, and are secured in position by bolts 23 (Fig. 2) passed through said pillars and through a top plate 24 (Fig. 1) and a stationary base plate 25. These bolts may also secure suitable supporting legs 26.

Slidably mounted in the frame thus provided is a vertically reciprocative head plate 27 which is provided, in common with the base plate 25 and top plate 24, with brace ribs 28 (Fig. 7) cast thereon to meet the relatively great strain incident to the operation of the machine. The means for slidably supporting this head plate comprises guide bars 29 (Fig. 7) bolted to and extending inwardly from the sides of the central pillars 20 and having beveled faces engaging beveled projections 30 at the sides of the reciprocative head plate 27.

To provide reciprocative movement of this head plate a cylinder 31 (Fig. 1) is mounted on the top plate 24 of the frame and disposed therein is a piston 32 operable preferably by compressed air and carrying a depending rod 23 journaled in the top plate 24 and having at its lower end a cross piece 33 to which is pivoted the lower ends of a pair of links 34 which each have their upper ends pivoted to one corner of a triangular link 35, each link being pivoted at 36 to an ear 37 depending from the top plate 24. The other corners of these links 35 are pivoted at 38 to the upper ends of levers 39 which have their lower ends pivoted at 40 to the upper ends of links 41 which in turn have their lower ends pivoted at 42 in blocks 43 (Fig. 7) bolted to the reciprocative head plate 27. Floating intermediate pivots 44 for the levers 39 are afforded by a common bar 45 connected therewith.

Thus, upward movement of the piston rod 23 will rock the triangular links 35, and swing the lower ends of the levers 39 and consequently the links 41 upwardly and outwardly to lift the head plate 27. Downward movement of the piston rod will bring the head plate into operative relation with the base plate 25 as shown in Fig. 1. Although not specifically shown on the drawing, it is noted that the pivots 38 and 40 can move outwardly slightly past a dead center with respect to the pivots 36, 44 and 42, this outward movement being limited by pairs of abutments 46 carried by the links 35 and the upper ends of the levers 39, and by pairs of abutments 47 carried by the links 41 and the lower ends of the levers 39. Thus, a locking arrangement is provided which resists upward movement of the head plate 27 due to the twisting operation, independently of the piston 32, after the head plate 27 has been lowered to operative position.

The six-throw crank shaft for which the present type of machine is particularly adapted comprises a central double crank bearing $a$ (Fig. 8) connected at each end by a cheek piece $a'$ with a shaft bearing $b$ which is connected by a cheek piece $c'$ with a second crank bearing $c$ connected in turn by a relatively long cheek piece $c^2$ with a third crank bearing $d$ which is connected by a cheek piece $d'$ with an end shaft bearing $e$. Reckoning from the horizontal flat position of the crank shaft bearings shown in Fig. 9, the central double crank bearing $a$ is swung downwardly, the crank bearings $c$ remain stationary, and the crank bearings $d$ are swung upwardly on arcs having as their centers the axes of the crank bearings $c$. To secure alinement of the end shaft bearings $e$ with the intermediate shaft bearings $b$, the end bearings are simultaneously twisted and shifted laterally, whereby their axes $f$ are made to coincide with the main axis $g$ of the intermediate shaft bearings $b$. It may be noted that all of the cheek pieces except the cheek pieces $c'$ are moved in the twisting operation.

These operations are effected by a set of separable twisting members supported for angular movement in a series of divided trunnion blocks, the latter comprising outer trunnion blocks 48 (Figs. 2 and 6), intermediate trunnion blocks 49 (Figs. 2 and 5), and central trunnion blocks 50 (Figs. 2 and 3). The separate parts of the intermediate and central trunnion blocks are directly bolted to the head and base plates respectively, and the outer trunnion blocks 48 are mounted to slide transversely in guide blocks 51 (Fig. 6) bolted to the same plates. The intermediate and central blocks and the guide blocks 51 are each provided with transverse ribs 52 engageable in common grooves 53 formed in the opposed faces of the plates, thereby insuring exact alinement of opposed blocks. Each of the trunnion blocks on its upper face is provided with a semi-cylindrical recess, forming in conjunction with its corresponding opposed block a common bearing for the twisting members carried by that pair of trunnion blocks.

Referring to Figs. 3 and 11, showing more particularly the means for twisting the central double crank bearings $a$ of the shaft, 54 designates each of a pair of central twisting members, each provided with a semi-cylindrical middle portion $54^a$ having a bearing in one of the central trunnion blocks 50 and each having also reduced extensions or bearing portions 55 (Figs. 1, 2 and 11) at its ends journaled in adjacent side portions of the intermediate trunnion blocks 49 (Fig. 2). It should be noted that the middle portion $49^a$ of the upper face of each trunnion block 49 is recessed to provide clearance for the cheek piece $c'$ which is disposed therein. The lower twisting member 54 (Fig. 3) is provided, beyond the side of its corresponding trunnion block 50, with outstanding ears 56 to which are pivoted the depending ears of a cross piece 57 carried by the upper ends of a pair of link rods 58 projecting downward through slots in the base plate 25 and connected at their lower ends to a cross piece carried by the piston rod of a cylinder mounted under the plate 25, this cross-piece and cylinder (not shown) being similar in nature to the end twisting cross pieces and cylinders shown in Fig. 1 and hereinafter described. Thus upon downward movement of the piston rod, the lower twisting member 54 will be rocked, causing a corresponding rocking movement of the upper twisting member 54, and thus twisting the double crank bearing $a$ of the shaft downwardly, the members 54 having common fixed bearings in the adjacent pairs of trunnion blocks 49 and 50.

For twisting the crank bearing $d$ upwardly, and for simultaneously twisting the end shaft bearings $e$ with respect thereto, to effect an inward shifting movement of the shaft bearings $e$ into proper alinement with the shaft bearings $b$, upper and lower twisting members 62 (Fig. 4) are mounted in each pair of shiftable trunnion blocks 48. Each of these members 62 (Fig. 12) comprises a semi-circular lateral extension 61 (Figs. 2 and 12) journaled in the corresponding block 48, and a substantially oblong body portion at the inner side of the block 48. Each of these oblong body portions is provided at its swinging end with an outstanding guide flange 63 (Figs. 4 and 12) disposed in an arc having as its center the axis of the crank bearing $d$ when the latter is in normal position between the blocks 62. These flanges coact to form a trunnion socket for the adjacent rounded ends of a pair of intermediate twisting members 64 (Fig. 13) which are provided at their bearing ends with lateral semi-cylindrical projections 65 (Fig. 1) journaled in the outer sides of the fixed bearing blocks 49. For rocking and simultaneously shifting the end twisting members 62 (Figs. 4 and 12) the lowermost member 62 is provided with an extension 66 to which is pivoted one end of a link 67 having its other end pivoted to a link 68 pivoted in turn to a bracket 69 on the lower or base plate 25, and pivoted also to depending ears on a cross piece 70 at the upper end of a pair of link rods 71 having their lower ends pivoted to a cross head 72 (Fig. 1) carried by the piston rod of a cylinder 73 mounted under the base plate 25. Thus upon downward movement of the rods 71, the twisting members 62 are simultaneously shifted both horizontally and angularly to position the shaft bearing $e$, while at the same time the members 64 swing about the axis of the fixed crank bearing $c$ on their flanges 65 to angularly position the crank bearing $d$. The sliding trunnion blocks 48 and the twisting members 62 carried thereby are normally held in initial receiving position by springs 74 (Fig. 6) passed through the guide blocks 51 and bearing against said blocks 48. The trunnion blocks 48 are also guided for proper movement by studs 75 projecting therefrom and slidable in holes in the guide blocks 51. For holding the twisting members 62 against vertical displacement with respect to their corresponding trunnion blocks 48, the bearing portion 61 (Figs. 2 and 12) of each twisting member 62 is provided with a peripheral key-hole slot 76 in which is engaged the head portion of a pin 77 (Fig. 6) carried by the corresponding trunnion blocks 48. Similar or suitable provision may be made for preventing vertical displacement of the twisting members 54 and 64. The upper twisting member 62 is automatically returned to its initial position by a spring 78 (Fig. 4) secured thereto and to the head plate 27.

Referring to Fig. 10, the crank bearings of the shaft are disposed at angles of 120 degrees from each other and at 60 degrees from their original horizontal position. Thus a twisting movement of 60 degrees only need be imparted to any twisting member, leaving a clearance of 30 degrees from the vertical, which readily permits vertical retracting movement of the upper head and of the twisting members carried thereby. It may be further noted that the meeting faces of the twisting members are interrupted to facilitate ready separation and retraction thereof. Movement of the twisting members past the exact desired angle is prevented by stops or abutments 79 (Figs. 3 and 4) on the trunnion blocks which engage the extensions 66 of the end twisting members 62, and the ears 56 (Fig. 3) of the lower central twisting member 54, respectively.

In operation, the flat crank shaft is laid on the lower twisting members, which are disposed with their upper faces horizontal, while said crank shaft retains the heat of the forging operation. The head plate 27 is then lowered to engage the twisting members thereof with the lower twisting members. The cylinders for actuating the central and end twisting members are then simultaneously operated and produce a simultaneously twisting movement of the various parts of the crank shaft to their proper relative positions. The head plate is then raised, and the twisting members mounted on the base plate are rocked to their normal horizontal positions. The twisted crank shaft then lies loosely upon the lower twisting members and may be readily withdrawn therefrom. The entire operation is thus positive and exceedingly rapid.

While I have shown and described a machine for twisting six-throw crank shafts, it is obvious that my invention may be utilized for twisting crank shafts having a different number of crank bearings, or for twisting other articles, and such machines may embody various changes and modifications of structure and arrangement, without departing in any manner from the spirit of my invention or exceeding the scope of the appended claims.

What is claimed is:

1. A crank shaft twisting machine having in combination a base plate, a head plate, holding and twisting devices each separable and each having portions associated with each of said plates, means to move one of said plates toward and from the other plate, and means to thereafter actuate said twisting devices angularly.

2. A crank shaft twisting machine having in combination relatively movable plates, means to produce relative movement between said plates, a set of shaft-holding blocks, a set of crank twisting members, and means to actuate said twisting members, said holding blocks and said twisting members being each formed in separable parts with one of each pair of blocks and one of each pair of members associated with each of said plates.

3. A crank shaft twisting machine comprising a base plate, a relatively movable head plate, shaft holding and crank twisting devices each formed with separable parts connected respectively to said base and head plates, means to move one of said plates to bring the separable parts of said holding and twisting devices into engagement with selected parts of a crank shaft, and means to thereafter actuate said crank twisting devices.

4. A crank shaft twisting machine comprising a base plate, a head plate reciprocative thereabove, separable twisting devices each having a portion associated with and movable with each one of said plates, means for reciprocating said head plate and for locking said plate in operative position, and means for thereafter effecting operative twisting movement of said devices relative to said plates.

5. A crank shaft twisting machine having in combination a frame, a base plate fixed in said frame, a head plate movable in said frame toward and from said base plate, means to support a crank shaft between said plates, means to twist certain parts of said shaft relative to said plates, said supporting and twisting means being each formed in separable parts, one part being associated with said base plate, and the coöperating part being movable with said head plate, means to move said head plate, and means to thereafter actuate said twisting means.

6. A crank shaft twisting machine comprising relatively movable base and head plates each provided with an arcuate trunnion surface, shaft holding devices mounted on said plates, separable crank twisting members each having an arcuate portion seated in one of said trunnion surfaces, means for relatively moving said plates to operative position, and means for thereafter rocking the twisting members on the associated trunnion surfaces.

7. A crank shaft twisting machine comprising a base plate, a head plate reciprocative thereabove, said plates being each provided with a trunnion surface and said surfaces being concentric when said plates are operatively positioned, a pair of separable crank twisting members each having a trunnion portion engageable with said trunnion surfaces, means to reciprocate said head plate, and means connected to one of said twisting members for rocking said twisting members after said head plate is operatively positioned.

8. A crank shaft twisting machine having, in combination, holding devices for the shaft bearings and for certain of the crank bearings, crank shaft twisting devices for the remaining crank bearings, and means to actuate said twisting devices and to simultaneously slide certain of said holding devices laterally to aline said shaft bearings.

9. A crank shaft twisting machine having, in combination, holding devices for the shaft bearings and for certain of the crank bearings, crank shaft twisting devices for the remaining crank bearings, means to actuate said twisting devices and to simultaneously slide certain of said holding devices laterally to aline said shaft bearings, said holding and twisting devices being each formed in separable parts permitting the insertion and removal of said shaft, and means to move said separable parts toward each other before operative actuation of said devices.

10. A crank shaft twisting machine having, in combination, a pair of shaft-holding blocks mounted to slide in a straight line, a crank twisting device mounted to swing about an axis fixed in said machine, a second crank twisting device having one end pivoted to said sliding blocks and having its opposite end pivoted to the swinging end of said first mentioned twisting device, and means connected to said second twisting device effective to simultaneously actuate said twisting devices and said sliding blocks.

11. A crank shaft twisting machine having, in combination, a base plate, a head plate, separable holding and twisting devices each having portions associated with each of said plates, means to move one of said plates toward and from the other plate, and means to thereafter actuate said twisting devices angularly, said plate-moving means comprising levers mounted on movable pivots, links connecting one end of each lever to one of said plates, and means connecting the opposite end of each lever to pivots fixed in the frame, said links, levers and members forming double toggle devices effective to resist separation of said plates when in operative position.

In testimony that I claim the foregoing I have hereunto set my hand at Detroit, in the county of Wayne and State of Michigan, in the presence of two witnesses.

MARK H. DAMERELL.

Witnesses:
GRACE R. GLINNAN,
THOMAS E. GLINNAN.